United States Patent
Umeshima

(10) Patent No.: US 8,089,905 B2
(45) Date of Patent: Jan. 3, 2012

(54) MULTICAST DISTRIBUTION SYSTEM AND METHOD FOR DISTRIBUTING DATA ON A MESH VIRTUAL NETWORK

(75) Inventor: Shingo Umeshima, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 118 days.

(21) Appl. No.: 12/450,710

(22) PCT Filed: Apr. 9, 2008

(86) PCT No.: PCT/JP2008/057381
§ 371 (c)(1),
(2), (4) Date: Oct. 8, 2009

(87) PCT Pub. No.: WO2008/133124
PCT Pub. Date: Nov. 6, 2008

(65) Prior Publication Data
US 2011/0044336 A1    Feb. 24, 2011

(30) Foreign Application Priority Data

Apr. 12, 2007  (JP) ................................ 2007-105211

(51) Int. Cl.
*H04L 12/28* (2006.01)

(52) U.S. Cl. ........ 370/256; 370/408; 709/221; 709/242; 709/252

(58) Field of Classification Search ........................ None
See application file for complete search history.

(56) References Cited

U.S. PATENT DOCUMENTS

| | | | | |
|---|---|---|---|---|
| 6,047,331 A | * | 4/2000 | Medard et al. ................ | 709/239 |
| 6,396,815 B1 | * | 5/2002 | Greaves et al. ............... | 370/256 |
| 6,728,205 B1 | * | 4/2004 | Finn et al. ..................... | 370/217 |
| 6,778,531 B1 | * | 8/2004 | Kodialam et al. ............. | 370/390 |
| 7,245,614 B1 | * | 7/2007 | Podar et al. ................... | 370/389 |

(Continued)

FOREIGN PATENT DOCUMENTS

JP    2004-531143    10/2004

(Continued)

OTHER PUBLICATIONS

S. Deering, "Host Extensions for IP Multicasting," Network Working Group, Stanford University (United States of America), p. 1-18, (Aug. 1989).
Armstrong, et al., "Multicast Transport Protocol," Network Working Group, Cornell, p. 1-39, (Feb. 1992).
W. Fenner, "Internet Group Management Protocol, Version 2," Network Working Group, Xerox PARC, p. 1-25, (Nov. 1997).

(Continued)

*Primary Examiner* — Ayaz Sheikh
*Assistant Examiner* — Timothy J Weidner
(74) *Attorney, Agent, or Firm* — Pillsbury Winthrop Shaw Pittman LLP

(57) ABSTRACT

Provided is a multicast distribution system which can perform a multicast distribution by selecting a communication path satisfying a communication feature required by a multicast group. A distribution source router (Rs) performs a multicast distribution to routers (R1 to R5) constituting a multicast group based on an application via a mesh virtual network connected to a plurality of routers. When the CPU load ratio and the multicast group communication feature exceed threshold values, the distribution source router updates the number of branches and the depth of the multicast tree which distributes a packet from the router and starts reconfiguration of the multicast tree. When reconfiguring the multicast tree, the distribution source router references a path feature of the mesh virtual network, selects a communication path having a sufficient path feature with a higher priority, and generates a routing table based on the multicast tree.

6 Claims, 15 Drawing Sheets

| CPU LOAD RATIO THRESHOLD VALUE TABLE | CPU LOAD RATIO | | 50% | |
|---|---|---|---|---|
| COMMUNICATION CHARACTERISTIC THRESHOLD VALUES TABLE FOR MULTICAST GROUPS | MULTICAST GROUP | BANDWIDTH | COMMUNICATION DELAY | |
| | MULTICAST GROUP A | Aw | Ad | |
| | MULTICAST GROUP B | Bw | Bd | |
| | MULTICAST GROUP C | Cw | Cd | |
| | ⋮ | | | |
| PATH CHARACTERISTICS TABLE FOR MESH VIRTUAL NETWORK | VIRTUAL PATH | BANDWIDTH | COMMUNICATION DELAY | |
| | VIRTUAL PATH a | aw | ad | |
| | VIRTUAL PATH b | bw | bd | |
| | VIRTUAL PATH c | cw | cd | |
| | ⋮ | | | |
| COMMUNICATION CHARACTERISTICS TABLE FOR MULTICAST GROUPS | MULTICAST GROUP | BANDWIDTH | COMMUNICATION DELAY | |
| | MULTICAST GROUP A | CAw | CAd | |
| | MULTICAST GROUP B | CBw | CBd | |
| | MULTICAST GROUP C | CCw | CCd | |
| | ⋮ | | | |

U.S. PATENT DOCUMENTS

| | | | | |
|---|---|---|---|---|
| 7,403,495 B2 * | 7/2008 | Sauermann | ............... | 370/256 |
| 7,418,454 B2 * | 8/2008 | Chen et al. | ............... | 707/101 |
| 7,457,257 B2 * | 11/2008 | Tang et al. | ............... | 370/256 |
| 7,562,143 B2 * | 7/2009 | Fellenstein et al. | ......... | 709/226 |
| 7,729,285 B2 * | 6/2010 | Yoon | ............... | 370/254 |
| 7,843,855 B2 * | 11/2010 | O'Neal | ............... | 370/256 |
| 2003/0135644 A1 * | 7/2003 | Barrett | ............... | 709/238 |
| 2003/0223372 A1 * | 12/2003 | Sanchez et al. | ............ | 370/237 |
| 2004/0213395 A1 * | 10/2004 | Ishii et al. | ............ | 379/201.01 |
| 2005/0076207 A1 | 4/2005 | Park et al. | | |
| 2005/0169183 A1 * | 8/2005 | Lakkakorpi et al. | ......... | 370/238 |
| 2006/0114903 A1 * | 6/2006 | Duffy et al. | ............ | 370/390 |
| 2007/0189193 A1 * | 8/2007 | Previdi et al. | ............ | 370/256 |
| 2007/0211703 A1 * | 9/2007 | Gu et al. | ............ | 370/356 |
| 2008/0175240 A1 * | 7/2008 | Suzuki | ............... | 370/390 |
| 2008/0205394 A1 * | 8/2008 | Deshpande et al. | ......... | 370/390 |
| 2009/0238182 A1 * | 9/2009 | Yanagihara | ............ | 370/390 |

FOREIGN PATENT DOCUMENTS

JP      2006-287919      10/2006

OTHER PUBLICATIONS

Cain, et al., "Internet Group Management Protocol, Version 3," Network Working Group, Ericsson, p. 1-54, (Oct. 2002).

Patent Cooperation Treaty "International Preliminary Report on Patentability and Written Opinion of the International Searching Authority" International Application No. PCT/JP2008/057381, Issue Date Oct. 13, 2009, 6 pages.

Patent Cooperation Treaty "International Preliminary Report on Patentability and Written Opinion of the International Searching Authority" International Application No. PCT/JP2006/057381, Issue Date Oct. 13, 2009, 6 pages.

Yang-Hua Chu, et al. "A Case for End System Multicast", IEEE Journal on Selected Areas in Communications, vol. 20, No. 8, Oct. 2002, pp. 1456-1471.

Dimitrios Pendarakis, et al. "ALMI: An Application Level Multicast Infrastructure", Proceedings of the third conference on USENIX Symposium on Internet Technologies and Systems, Mar. 2001, pp. 49-60.

* cited by examiner

FIG.3

| | CPU LOAD RATIO | | |
|---|---|---|---|
| CPU LOAD RATIO THRESHOLD VALUE TABLE | 50% | | |

| | MULTICAST GROUP | BANDWIDTH | COMMUNICATION DELAY |
|---|---|---|---|
| COMMUNICATION CHARACTERISTIC THRESHOLD VALUES TABLE FOR MULTICAST GROUPS | MULTICAST GROUP A | Aw | Ad |
| | MULTICAST GROUP B | Bw | Bd |
| | MULTICAST GROUP C | Cw | Cd |
| | ... | | |

| | VIRTUAL PATH | BANDWIDTH | COMMUNICATION DELAY |
|---|---|---|---|
| PATH CHARACTERISTICS TABLE FOR MESH VIRTUAL NETWORK | VIRTUAL PATH a | aw | ad |
| | VIRTUAL PATH b | bw | bd |
| | VIRTUAL PATH c | cw | cd |
| | ... | | |

| | MULTICAST GROUP | BANDWIDTH | COMMUNICATION DELAY |
|---|---|---|---|
| COMMUNICATION CHARACTERISTICS TABLE FOR MULTICAST GROUPS | MULTICAST GROUP A | CAw | CAd |
| | MULTICAST GROUP B | CBw | CBd |
| | MULTICAST GROUP C | CCw | CCd |
| | ... | | |

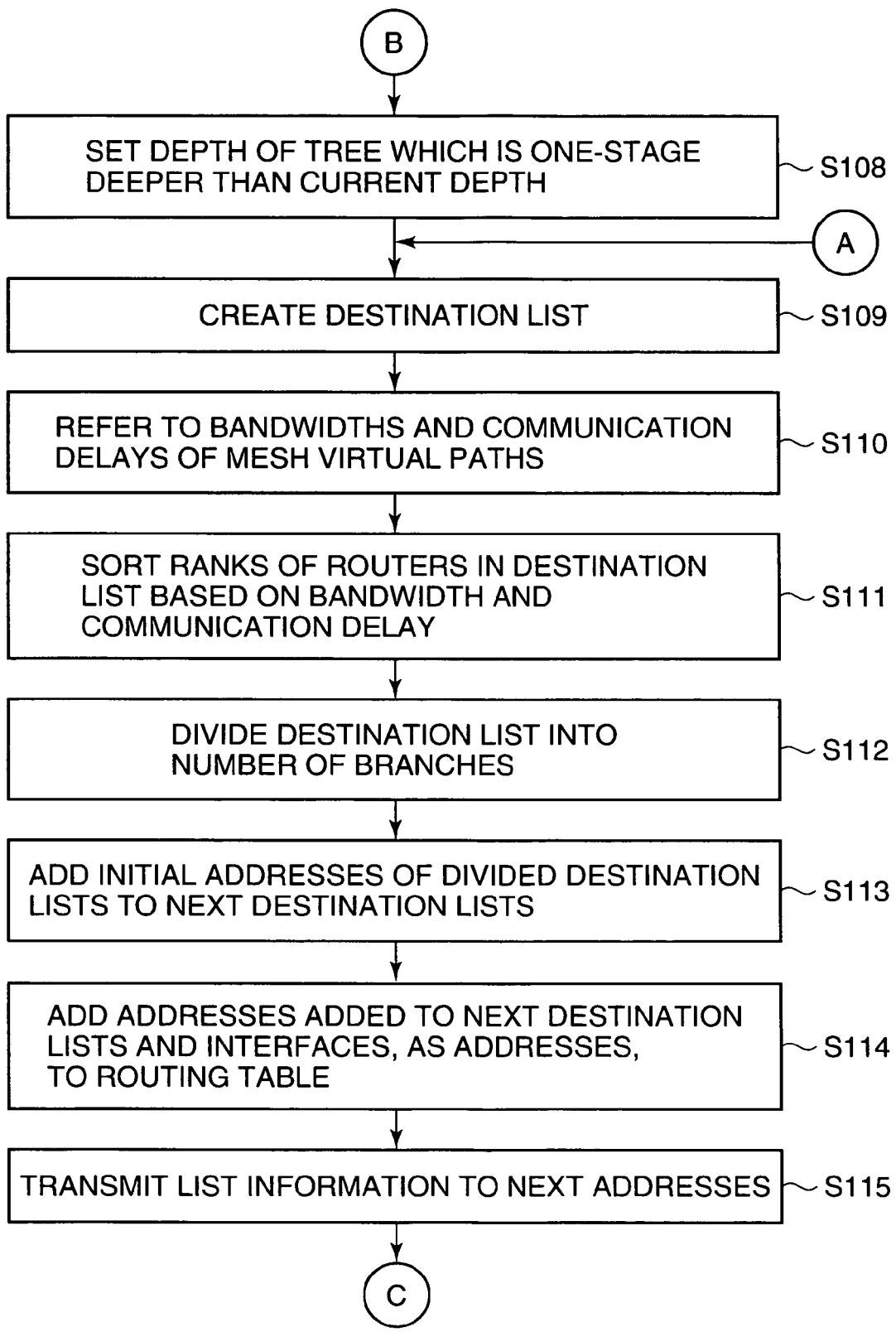

MULTICAST DISTRIBUTION SYSTEM AND METHOD FOR DISTRIBUTING DATA ON A MESH VIRTUAL NETWORK

TECHNICAL FIELD

The present invention relates to a multicast distribution system for distributing packets in a mesh virtual network, and a method therefor.

BACKGROUND ART

To distribute multicast packets, a multicast tree has heretofore been constructed by using a multicast routing protocol, e.g., PIM-SM (Protocol Independent Multicast-Sparse Mode), PIM-DM (Protocol Independent Multicast-Dense Mode), or DVMRP (Distance Vector Multicast Routing Protocol), for constructing a path with the minimum hop number to reduce a communication delay, and the resulting multicast tree is utilized for packet distribution (see, Japanese National Patent Publication No. 2004-531143).

Japanese National Patent Publication No. 2004-531143 discloses a virtual multicast network method and system in which packet distribution is performed based on a multicast routing protocol, e.g., PIM-SM, PIM-DM, or DVMRP, by using virtual multicast routers in a network that does not support multicast distribution.

However, if the multicast routing protocol, e.g., PIM-SM, PIM-DM, or DVMRP, is used in a mesh virtual network, packets are transmitted from the distribution source router to all the routers, and therefore a large load is applied to the distribution source router. Furthermore, the required bandwidth, delay amount, etc. differ between multicast groups (packet distribution destinations), which are constructed according to application software (hereinafter referred to as application).

DISCLOSURE OF INVENTION

The present invention provides a multicast distribution system and a multicast distribution method that create a multicast tree for deciding a distribution path so as to satisfy a characteristic of a multicast group constructed according to application software and perform data distribution based on the resulting multicast tree.

The present invention provides a multicast distribution system in which multicast distribution is performed from a distribution source router to a plurality of distribution destination routers constituting a multicast network formed on a mesh virtual network, wherein the distribution source router comprises first monitor means configured to monitor and detect a CPU load ratio in the distribution source router, a communication characteristic of a multicast group constructed on the multicast network, and a path characteristic of the mesh virtual network, storage means configured to store a threshold value of the CPU load ratio and a threshold value of the communication characteristic of the multicast group, and first control means configured, based on the path characteristic of the mesh virtual network detected by the first monitor means and at least one of a result of comparison between the CPU load ratio detected by the first monitor means and the threshold value of the CPU load ratio stored in the storage means and a result of comparison between the communication characteristic of the multicast group detected by the first monitor means and the threshold value of the communication characteristic of the multicast group stored in the storage means, to start reconstruction of a multicast tree that defines a packet distribution path from the distribution source router, and based on the multicast tree, start recreation of a routing table that decides a multicast distribution path.

With this construction, the distribution source router performs multicast distribution to distribution destination routers of a multicast group constructed on a multicast network. The multicast network is formed on a mesh virtual network. The distribution source router monitors a CPU load ratio in the distribution source router, a communication characteristic of the multicast group, and a path characteristic of the mesh virtual network. The communication characteristic of the multicast group includes at least one of a bandwidth and a communication delay thereof, and is calculated by monitoring packets for the multicast group. The path characteristic of the mesh virtual network includes at least one of a bandwidth and a communication characteristic thereof, and is calculated by monitoring packets flowing on the mesh virtual network. Further, the distribution source router stores the CPU load ratio and the communication characteristic of the multicast group. In addition, the distribution source router starts reconstruction of a multicast tree based on the path characteristic of the mesh virtual network and at least one of a result of comparison between the CPU load ratio and a threshold value thereof and a result of comparison between the communication characteristic of the multicast group and a threshold value thereof. The distribution source router recreates a routing table based on the reconstructed multicast tree. As a result, a multicast distribution path can be selected according to a load status of the distribution source router, the communication characteristic of the multicast group, and the path characteristic of the mesh virtual network. Therefore, multicast distribution can be carried out by selecting a communication path that satisfies a communication characteristic requested by the multicast group. Even if a large load is applied to the distribution source router due to, e.g., the increase in number of distribution of packets, the CPU load ratio in the distribution source router can be maintained at or below a certain value (threshold value). Further, even if a communication delay or the like is caused in a part of virtual path on the mesh virtual network due to, e.g., the increase in number of packets flowing on the mesh virtual network, multicast distribution is performed by selecting a path having a path characteristic margin, whereby multicast distribution can be performed without causing a communication delay or the like. In this manner, since load of the distribution source router and bandwidth load of an actual path constituting the mesh virtual network can be reduced, it is possible to ensure the scalability of multicast distribution without the need of investment of hardware facilities for the distribution source router and the actual network.

In the multicast distribution system of this invention, the first control means of the distribution source router can be configured, in a case where at least one of values of the CPU load ratio monitored by the first monitor means and the communication characteristic of the multicast group monitored by the first monitor means exceeds the threshold value thereof, to change number of branches and depth of the multicast tree and start reconstruction of the multicast tree based on the number of branches and the depth of the multicast tree after change and the path characteristic of the mesh virtual network.

With this construction, the distribution source router changes the number of branches and the depth of the multicast tree in a case where at least one of the CPU load ratio and the communication characteristic of the multicast group exceeds the threshold value thereof. Based on the number of branches and the depth of the multicast tree after change and the path characteristic of the mesh virtual network, the distribution source router starts reconstruction of the multicast tree. With the reconstructed multicast tree, multicast packets can be distributed via the distribution destination routers, without the need of directly distributing the multicast packets from the distribution source router to all the distribution destination routers, whereby the load of the distribution source router can reliably be deconcentrated.

Further, in the multicast distribution system of this invention, each of the distribution destination routers can comprise second monitor means configured to monitor the path characteristic of the mesh virtual network, communication means configured to distribute and receive distribution information that instructs distribution of packets, second control means configured to implement reconstruction of the multicast tree that defines the packet distribution path from the distribution source router, based on number of branches and depth of the multicast tree contained in the distribution information and the path characteristic of the mesh virtual network acquired by the second monitor means, and based on the multicast tree, implement recreation of a routing table that decides the multicast distribution path, and the first control means of the distribution source router completes the multicast tree when the recreation of the routing tables of all the distribution destination routers is completed.

With this construction, each of the distribution destination routers implements the reconstruction of the multicast tree that specifies the packet distribution path from the distribution source router based on the number of branches and the depth of the multicast tree and the path characteristic of the mesh virtual network. The distribution destination router monitors the path characteristic of the mesh virtual network and decides the packet distribution path based on the path characteristic of the mesh virtual network. The distribution destination router implements the recreation of the routing table based on the reconstructed multicast tree. The multicast tree is completed when the recreation of the routing tables for all the distribution destination routers are finished. Thus, the packet distribution path from the distribution destination router can be decided so as to select a communication path having a margin in consideration of the path characteristic of the mesh virtual network of the distribution destination routers. As a result, the distribution destination router is able to reduce a bandwidth load of an actual network that distributes multicast packets from the distribution destination router and constitutes the mesh virtual network, and it is therefore possible to ensure the scalability of multicast distribution without the need of investment of hardware facility of actual network.

Further, in the multicast distribution system of this invention, the storage means of the distribution source router can store, as the threshold value of the communication characteristic of the multicast group, the communication characteristic of the multicast group detected for the first time by the first monitor means of the distribution source router.

With this construction, the communication characteristic of multicast group detected for the first time is used as the threshold value of the communication characteristic of the multicast group. As a result, at multicast distribution, the threshold value of the communication characteristic of the multicast group for the multicast group can automatically be set, whereby routing tables can automatically be created according to the communication characteristic requested by the multicast group.

In the multicast distribution system of this invention, at the multicast distribution, the first control means of the distribution source router can determine, at predetermined timings, whether the multicast tree should be reconstructed.

With this construction, whether the multicast tree should be reconstructed is determined at predetermined timings which are set in terms of, e.g., time or the number of transmitted packets, whereby the multicast tree can dynamically be reconstructed at the time of multicast distribution according to a load state of the router and change in bandwidth and communication delay of the multicast network forming the multicast group. For example, the multicast tree can dynamically be reconstructed in response to the increase in load of the router or the increase in the number of packets on the virtual path of the multicast group during the multicast distribution. As a result, the multicast distribution can be performed while always selecting a path that satisfies the communication characteristic requested by the multicast group.

The present invention provides a multicast distribution method in which multicast distribution is performed from a distribution source router to a plurality of distribution destination routers constituting a multicast network formed on a mesh virtual network, comprising the steps of monitoring and detecting, by the distribution source router, a CPU load ratio in the distribution source router, a communication characteristic of a multicast group constructed on the multicast network, and a path characteristic of the mesh virtual network, reading, by the distribution source router, a threshold value of the CPU load ratio and a threshold value of the communication characteristic of the multicast group, which are stored in storage means, and changing number of branches and depth of a multicast tree by the distribution source router in a case where at least one of values of the CPU load ratio and the communication characteristic of the multicast group exceeds the threshold value of the CPU load ratio or the communication characteristic of the multicast group, starting, based on the number of branches and the depth of the multicast tree and the path characteristic of the mesh virtual network, reconstruction of the multicast tree for distributing packets from the distribution source router, and starting, based on the multicast tree, recreation of routing tables that decide a multicast distribution path.

According to the present invention, the multicast tree is reconstructed according to a load state of the distribution source router and the communication characteristic of the multicast group, and therefore, the multicast distribution can be carried out by selecting a communication path that satisfies the communication characteristic requested by the multicast group.

BRIEF DESCRIPTION OF DRAWINGS

FIG. 3 is a view for explaining a search database of a distribution source router shown in FIG. 1;

FIGS. 12A and 12B are a flowchart showing a routing table creation process executed by the distribution source router.

BEST MODE FOR CARRYING OUT THE INVENTION

Figure 1:
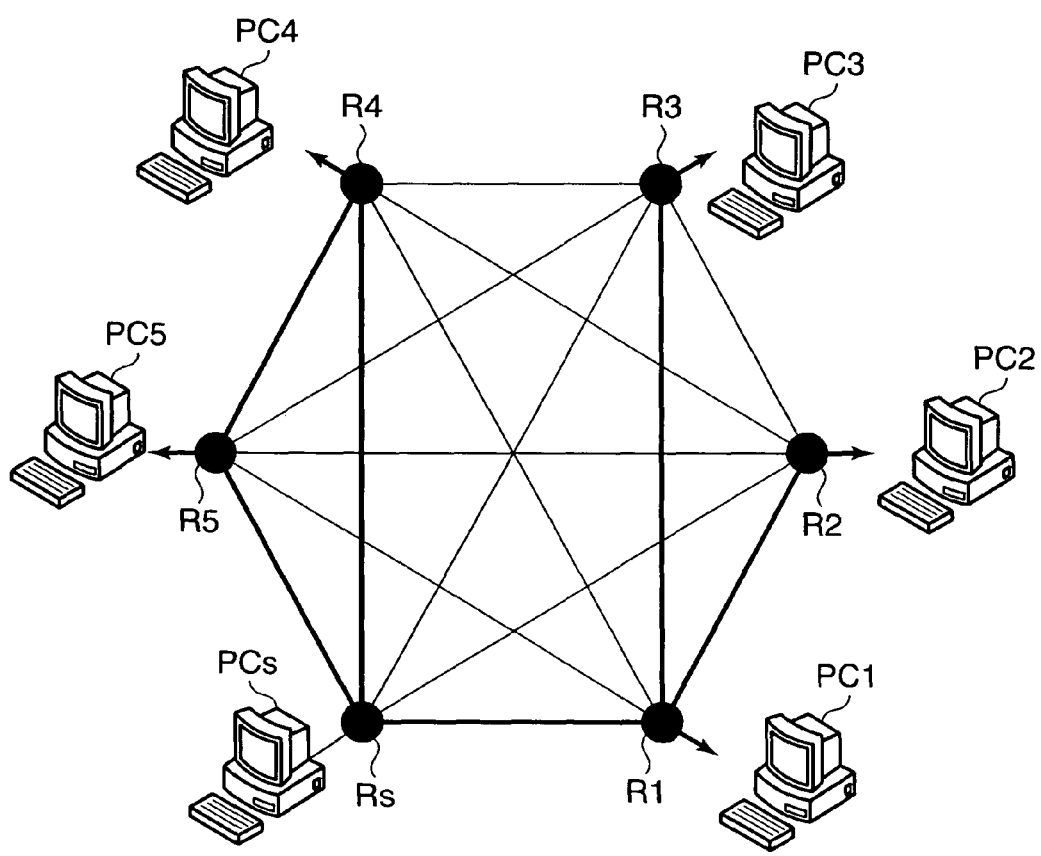
FIG. 1 is a view for explaining multicast distribution performed between routers connected to a mesh virtual network.

FIG. 1 illustrates multicast distribution performed between a plurality of routers connected to a mesh virtual network. As shown in FIG. 1, routers R (Rs and R1 to R5) are connected to the mesh virtual network and connected to respective ones of communication devices PC (PCs and PC1 to PC5) each implemented by e.g., a personal computer or a cell phone. In the illustrated example, the router Rs is a distribution source router that performs multicast distribution to the other routers. Specifically, the router Rs receives a multicast packet from an application for multicast distribution running on the communication device PCs, and performs multicast distribution to distribution destination routers related to the application, e.g., the routers R1 to R5. To this end, the distribution source router Rs creates, on the mesh virtual network, a multicast network that constitutes a multicast packet communication path from the router Rs to the distribution destination routers, and creates on the multicast network a multicast group according to the application. The multicast group is represented by addresses of multicast packet distribution destinations (addresses of the routers R1 to R5).

At the multicast distribution from the router Rs, the router Rs compares, at predetermined timings, a CPU load ratio in the router Rs with a threshold value thereof and compares a communication characteristic of the multicast group with a threshold value thereof. The CPU load ratio in the router Rs represents a load ratio of a CPU of the router Rs. The threshold value of the CPU load ratio is a threshold value thereof set in advance by a user. The communication characteristic of the multicast group is periodically measured and includes at least one of a bandwidth and a communication delay of the multicast group. The threshold value of the communication characteristic of the multicast group includes a threshold value of at least one of the bandwidth and the communication delay of the multicast group. In this embodiment, the threshold value of the communication characteristic of the multicast group is a value of the communication characteristic measured for the first time.

In a case where the communication characteristic of the multicast group only includes either the bandwidth or the communication delay, the threshold value of the bandwidth or the communication delay is used as the threshold value of the communication characteristic of the multicast group. In a case where the communication characteristic of the multicast group includes both the bandwidth and the communication delay, the threshold values of the bandwidth and the communication delay are used as the threshold value of the communication characteristic of the multicast group.

The distribution source router Rs distributes multicast packets by referring to an existing routing table in a case where the CPU load ratio is equal to or less than the threshold value thereof and the communication characteristic of the multicast group is equal to or less than the threshold value thereof. In a case where the CPU load ratio exceeds the threshold value thereof or the communication characteristic of the multicast group exceeds the threshold value thereof, the router Rs changes the number of branches and the depth of a multicast tree. Then, based on the number of branches and the depth after change and a path characteristic of the mesh virtual network, the router Rs starts reconstruction of the multicast tree and starts recreation of the routing table.

At start of reconstruction of the multicast tree, the distribution source router Rs creates a tree from the router Rs to distribution destination routers R (e.g., routers R1 and R5) to which packets are directly distributed from the router Rs. Then, reconstruction of trees is also executed sequentially for the respective distribution destination routers R. The multicast tree is completed when the reconstruction of trees for all the distribution destination routers R is completed. At start of recreation of the routing table, the distribution source router Rs registers addresses of the distribution destination routers R based on the tree from the router Rs to the distribution destination routers R. Recreation of routing tables is also executed sequentially for respective distribution destination routers R. When the recreation of routing tables of all the distribution destination routers R is completed, the multicast tree is completed. Then, contents of the multicast tree are reflected on the routing table of the router Rs, whereby the routing tables of the routers Rs, R are completed.

A path characteristic of the mesh virtual network required to complete the multicast tree and the routing tables is measured separately from the communication characteristic of the multicast group. The path characteristic includes at least one of a bandwidth and a communication delay of the mesh virtual network.

After the multicast tree and the routing tables are completed as described above, the router Rs distributes multicast packets based on the reconstructed routing table. In a case where the communication characteristic requested by the multicast group for the packet distribution is not satisfied, a multicast tree and routing tables suited to the communication characteristic of multicast group are automatically created by the distribution source router Rs and the distribution destination routers R, and multicast packet distribution is performed by using the routing tables. In a case for example that the threshold value is exceeded, the router Rs starts reconstruction of the multicast tree and recreation of the routing table, and after completion of the reconstruction and recreation, multicast packets are distributed from the router Rs to the other routers R1 to R5 in the following order.

First, the distribution source router Rs distributes a packet to the routers R1, R5. Next, the router R1 receiving the packet distributes the packet to the routers R2, R3, and the router R5 distributes the packet to the router R4. In this manner, the router Rs and the other routers R1 to R5 are virtually disposed in a tree-shaped structure, in which the router Rs serves as a vertex node, and the routers set as parent nodes (routers R1, R5) distribute a packet to the routers set as child nodes (routers R2, R3, R4) (as shown by bold arrows on the mesh virtual network in FIG. 1), whereby the router Rs is able to distribute the multicast packet to all the routers R1 to R5. As described above, in a case for example that the CPU load ratio in the router Rs requested by the multicast group becomes large or the communication characteristic of the multicast group exceeds its threshold value, reconstruction of the multicast tree and recreation of routing tables are performed to eliminate the necessity of directly distributing packets from the router Rs to all the routers R1 to R5, whereby the load of the CPU of the router Rs can be reduced.

Figure 2:
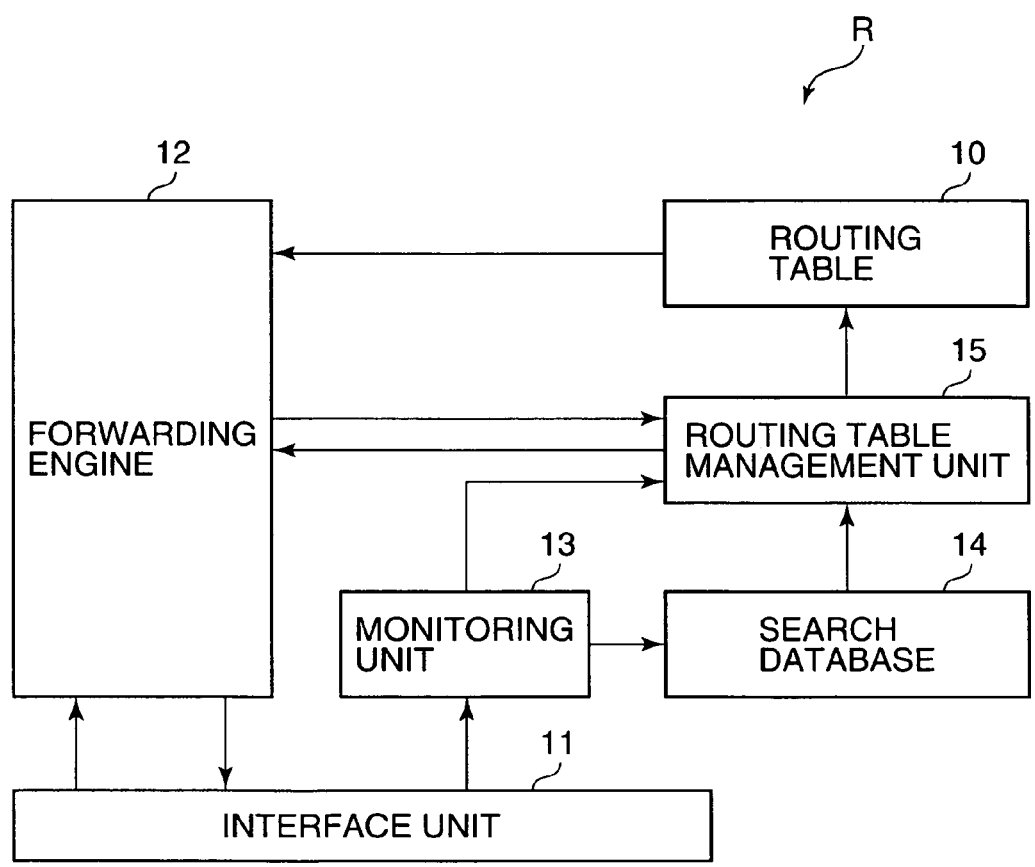
FIG. 2 is a block diagram showing the construction of each of the routers shown in FIG. 1.

Next, the constructions of the routers R are described with reference to FIG. 2, which is a block diagram showing the construction of each router R. The distribution source router Rs and the distribution destination routers R1 to R5 have substantially the same construction as one another. In the following, the router Rs is described as a representative example, and further, differences between the router Rs and the other routers R1 to R5 are described. As shown in FIG. 2, the router Rs includes a routing table (Table_new) 10, an interface unit 11, a forwarding engine 12, a monitoring unit 13 (more generally, monitor means), a search database 14 (storage means), and a routing table management unit 15 (control means).

The routing table 10 stores a plurality of entries in each of which a network address representing a packet destination and information representing a network interface to be used are written. The routing table 10 is referred to by the forwarding engine 12 when the router Rs transmits a packet to any of the other routers R1 to R5. Specifically, the forwarding engine 12 checks whether the entries stored in the routing table 10 include an entry describing a network address representing a packet destination, and if such an entry is stored in the routing table 10, transmits a packet from a network interface written in that entry to a router R having the network address written therein. If a packet destination is not written in any of the entries in the routing table 10, the forwarding engine 12 transmits the packet to a router R which is set as a default gateway.

The interface unit 11 is an interface part with an actual network that constitutes the mesh virtual network, and is connected for data transmission and reception with the actual network. Specifically, the interface unit 11 outputs to the actual network a packet input from the forwarding engine 12, and outputs to the forwarding engine 12 a packet input from the actual network.

The forwarding engine 12 of the router Rs refers to the routing table 10 and performs data transmission/reception to and from the other routers R1 to R5 via the interface unit 11. At recreation of the routing table 10, the forwarding engine 12 transmits and receives, via the interface unit 11 to and from the routers R1 to R5, list information necessary for the recreation of the routing table 10 (destination lists, next destination lists, and the number of branches and depth of a multicast tree (hereinafter referred to as the tree)).

More specifically, when a packet is input from the interface unit 11, the forwarding engine 12 refers to the routing table 10 to acquire one or more packet destinations (network addresses of transmission destination routers R), and outputs the packet input from the interface unit 11 to the transmission destination routers R via the interface unit 11. At that time, depending on the packet quantity to be output to the interface unit 11, the forwarding engine 12 is able to destroy the packet, if the rank of the packet is low.

At the recreation of the routing table 10, the forwarding engine 12 outputs list information input from any of the routers R1 to R5 to the routing table management unit 15, and outputs list information input from the routing table management unit 15 to one or more routers R specified by the routing table management unit 15.

The monitoring unit 13 of the router Rs periodically measures, via the interface unit 11, the communication characteristic of a multicast group and the path characteristic of the mesh virtual network, and outputs measurement results to the search DB 14. The monitoring unit 13 also measures the CPU load ratio in the router Rs, and outputs a measurement result to the routing table management unit 15. The monitoring units 13 of the other routers R1 to R5 each periodically measure only the path characteristic of the mesh virtual network.

The communication characteristic of the multicast group includes at least one of a bandwidth and a communication delay, which are calculated by monitoring packets for the multicast group formed on the multicast network. The path characteristic of the mesh virtual network includes at least one of a bandwidth and a communication delay which are calculated by monitoring packets flowing on the mesh virtual network. The communication characteristic of the multicast group and the path characteristic of the mesh virtual network are different from each other in that the communication characteristic of the multicast group is calculated based on a stream of multicast packets for the multicast group on the multicast network, whereas the path characteristic of the mesh virtual network is calculated based on a stream of, e.g., multicast packets or unicast packets on the mesh virtual network.

FIG. 3 shows the construction of a search database (hereinafter referred to as the search DB) in the router Rs. The search DB 14 includes a CPU load ratio threshold value table, a communication characteristic threshold values table for multicast groups, a path characteristics table for the mesh virtual network, and a communication characteristics table for multicast groups (hereinafter referred to as the CPU threshold value table, communication characteristic threshold values table, path characteristics table, and communication characteristics table). The search DBs 14 of the routers R1 to R5 each include only the path characteristics table. In the following description, it is assumed that the communication characteristics of multicast groups and the path characteristics of the mesh virtual network each include a bandwidth and a communication delay.

The threshold value of the CPU load ratio in the router Rs is registered in the CPU threshold value table. The threshold value of the CPU load ratio is set by a user. As previously described, when the CPU load ratio in the router Rs exceeds the threshold value thereof, the router Rs that performs multicast distribution starts reconstruction of the tree, and starts recreation of the routing table 10.

In the communication characteristic threshold values table, threshold values of the bandwidth and the communication delay requested by multicast groups are registered as the threshold values of communication characteristics of the multicast groups. In this embodiment, a value of communication characteristic of a multicast group measured for the first time by the monitoring unit 13 of the router Rs at multicast distribution is registered as the threshold value of the communication characteristic of the multicast group, whereby the threshold value of the communication characteristic can automatically be set for every multicast group.

In the path characteristics table of each router R, the bandwidth and the communication delay of the mesh virtual network are periodically registered. The path characteristic value of the mesh virtual network is measured for every virtual path from each router R to the other routers R1 to R5 and registered in the path characteristics table. The path characteristic value is periodically updated by the monitoring unit 13. Based on the path characteristics of the mesh virtual network registered in the path characteristics table, the router Rs selects a communication path having a path characteristic margin and creates the routing table 10 of the router Rs. Also in the other routers R1 to R5, the path characteristics tables are periodically updated in a similar manner, and routing tables 10 of the routers R1 to R5 are created, while selecting communication paths each having a path characteristic margin based on the path characteristics of the mesh virtual network registered in the path characteristics tables.

In the communication characteristics table of the router Rs, the bandwidth and the communication delay of each multicast group are registered as the communication characteristic of that group. The communication characteristics of multicast groups are registered for each of virtual paths from the router Rs to the other routers R1 to R5 for multicast groups and are periodically updated by the monitoring unit 13. As with the CPU load ratio, the communication characteristic of each multicast group is used as a judgment value to determine whether the tree should be reconstructed. Specifically, if the communication characteristic of multicast group exceeds its threshold value, reconstruction of the tree is started. If the communication characteristic of multicast group does not exceed the threshold value, reconstruction of tree is not performed, and the existing routing table 10 is used as it is for execution of multicast distribution.

In the above description, it is assumed that the distribution source router Rs has the search DB 14 shown in FIG. 3 and the distribution destination routers R1 to R5 each have only the path characteristics table in the search DB 14. However, when any of the routers R1 to R5 serves as a distribution source router, that router has, of course, the search DB 14 shown in FIG. 3.

The routing table management unit 15 creates and recreates the routing table 10. At recreation of the routing table 10, the routing table management unit 15 decides the number of branches and the depth of the tree based on the CPU load ratio and the threshold value thereof or based on the communication characteristic of multicast group and the threshold value thereof. Then, based on the path characteristic of the mesh virtual network, the routing table management unit 15 starts to recreate the routing table 10.

More specifically, at the time of creation of a multicast group, the routing table management unit 15 creates a default routing table 10 by a general method. Namely, the routing table management unit 15 calculates the number of hops of paths from the router Rs to the other routers R1 to R5, and creates the default routing table 10 for multicast distribution such that a packet passes through a path with the minimum hop number. In a case that multicast distribution is performed by using the default routing table 10, a packet is distributed from the router Rs directly to each of the other routers R1 to R5.

The routing table management unit 15 of the router Rs determines, at a predetermined timing, whether reconstruction of the tree is necessary, i.e., whether recreation of the routing table 10 is necessary, and if necessary, starts to recreate the routing table 10. Whether recreation of the routing table 10 is necessary is determined by the routing table management unit 15 by determining whether the CPU load ratio in the router Rs or the communication characteristic of multicast group exceeds the threshold value thereof. If the CPU load ratio in the router Rs or the bandwidth of the multicast group exceeds the threshold value, the routing table management unit 15 of the router Rs sets the number of branches of the tree to half of that currently set. The bandwidth of the multicast group exceeding the threshold value represents that the bandwidth of the multicast group becomes narrower than the threshold value. If the communication delay of multicast group exceeds its threshold value, the depth of the tree is set to one which is one-stage deeper than that currently set. The routing table management unit 15 starts reconstruction of the tree based on the set number of branches and depth of the tree and the path characteristic of the virtual network.

Whether reconstruction of the tree is necessary is determined at a timing in which multicast distribution from the distribution source router Rs is performed for the first time. A similar determination can be made at a subsequent timing, which is set by a user or automatically set for every multicast group. For example, the timing is set in terms of time, e.g., once for every ten seconds or for every one minute, or in terms of the number of distributed packets, e.g., once for every 100 or 1000 packets. Alternatively, the timing is set such that the determination is made each time packet distribution is performed.

Further, the routing table management unit 15 resets the routing table 10 in a predetermined timing. Specifically, the routing table management unit 15 recreates the routing table 10 by a general method each time the determination of whether the tree should be reconstructed has been made 10 or 20 times or each time the tree has been reconstructed 5 or 10 times. As a result, even if packets passing through the routers R temporarily increase and the tree is constructed to have a small number of braches and a deep depth, the tree is reset in the predetermined timing after the temporary packet increase is eliminated, and it is therefore possible to reconstruct the tree so as to meet the communication characteristic requested at that time by the multicast group.

Figure 4:
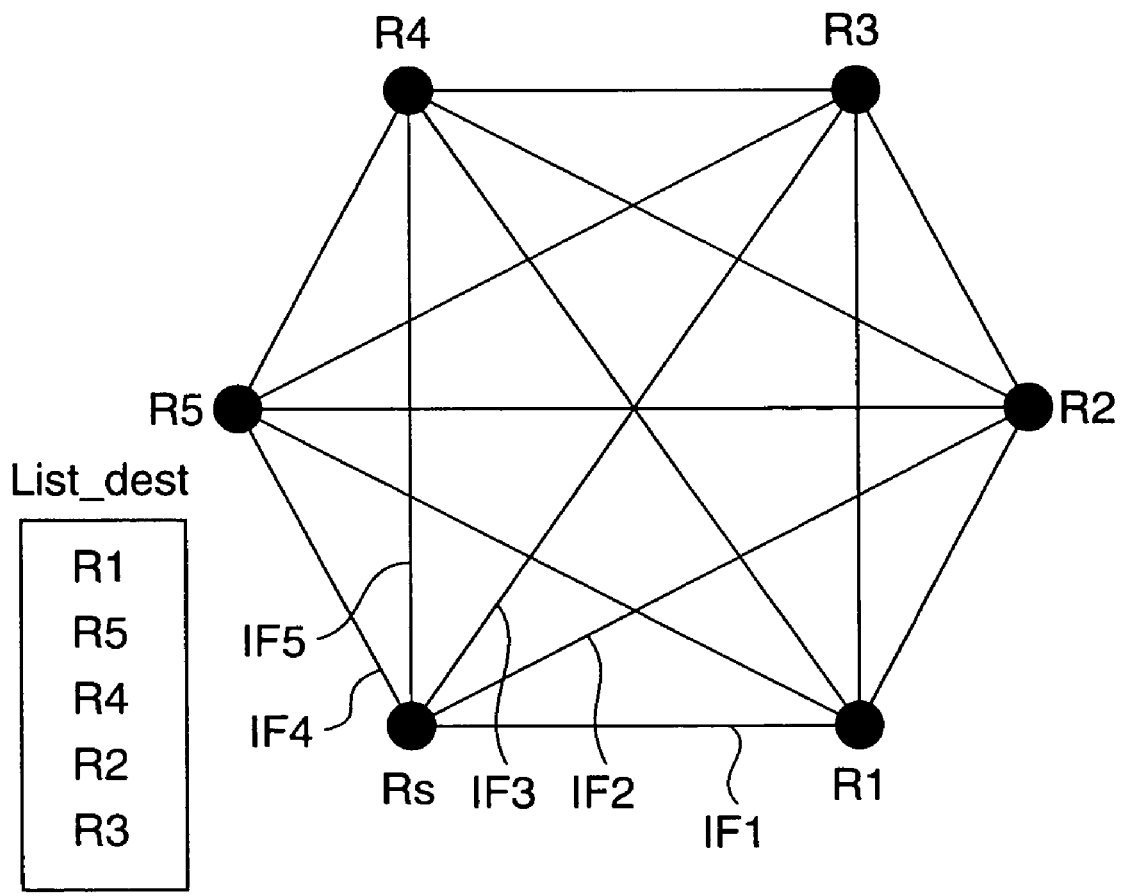
FIG. 4 is a view showing a destination list for the distribution source router created by a routing table creation process performed by the distribution source router, together with the mesh virtual network.
Figure 10:
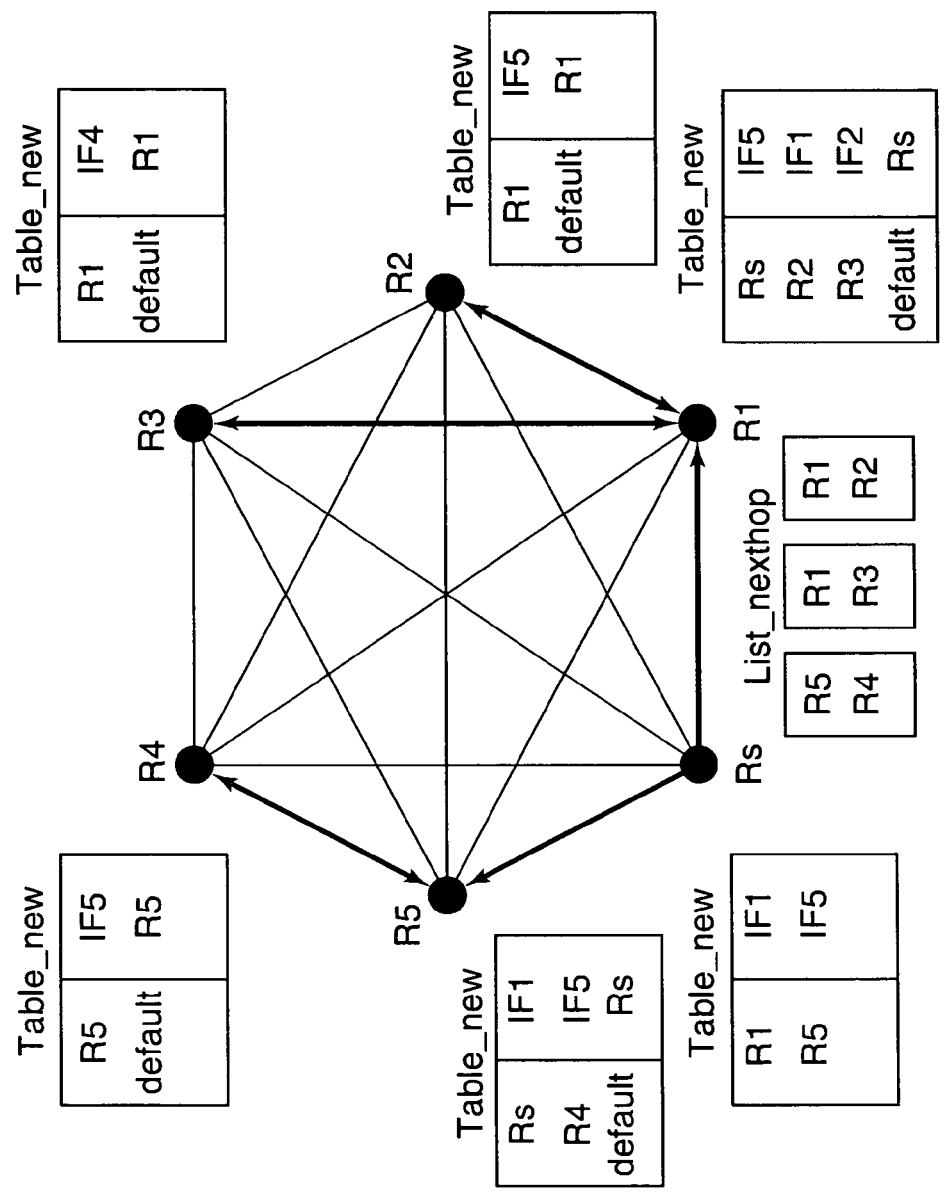
FIG. 10 is a view showing routing tables for the parent routers and next destination lists transmitted from the parent routers to the distribution source router, which are created in routing table creation processes executed by the two parent routers, together with routing tables for the distribution source router and the child routers, and the mesh virtual network.
Figure 11:
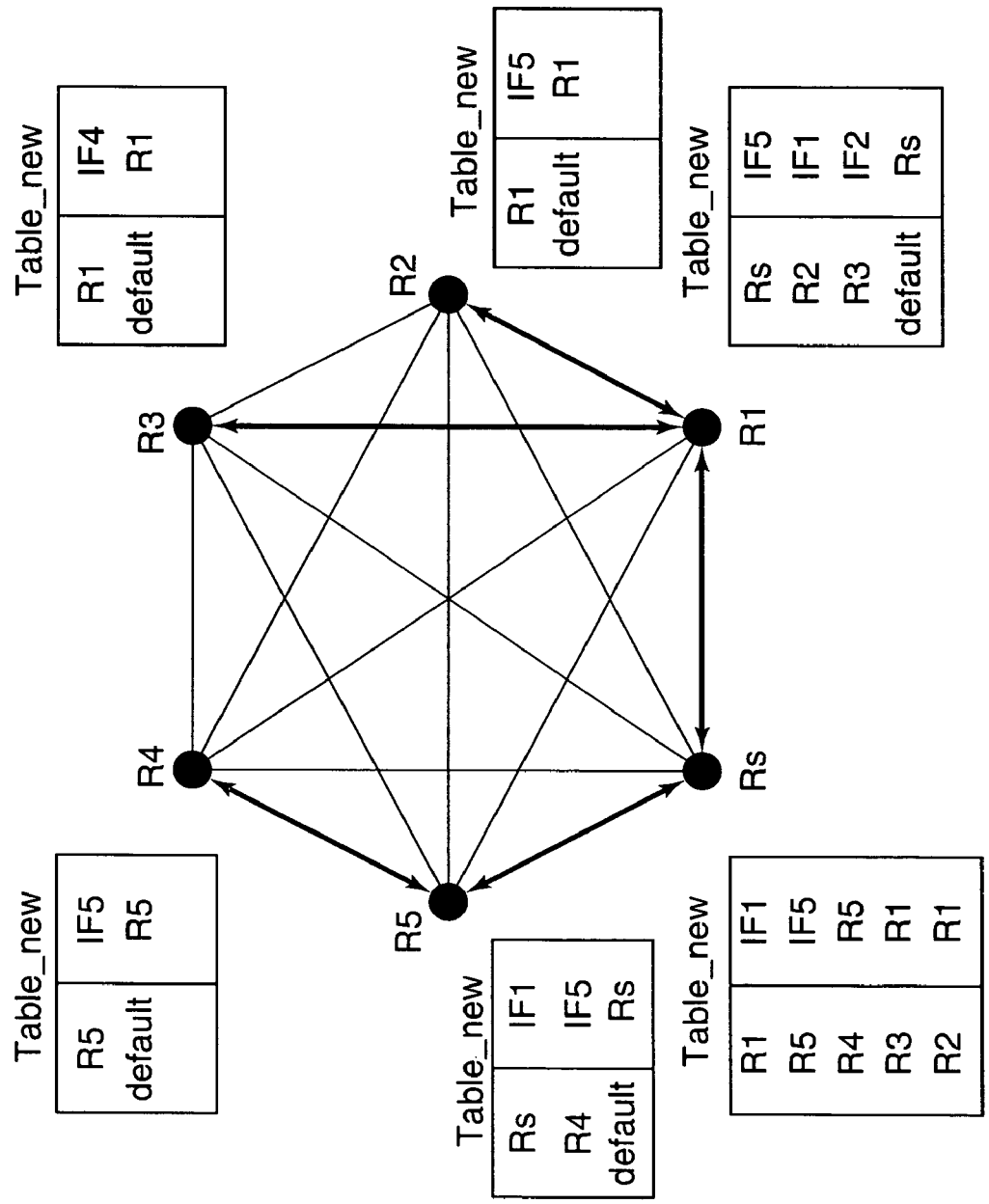
FIG. 11 is a view showing a routing table for the distribution source router created by a routing table creation process executed by the distribution source router, together with routing tables for the parent routers and child routers, and the mesh virtual network.
Figure 12A:
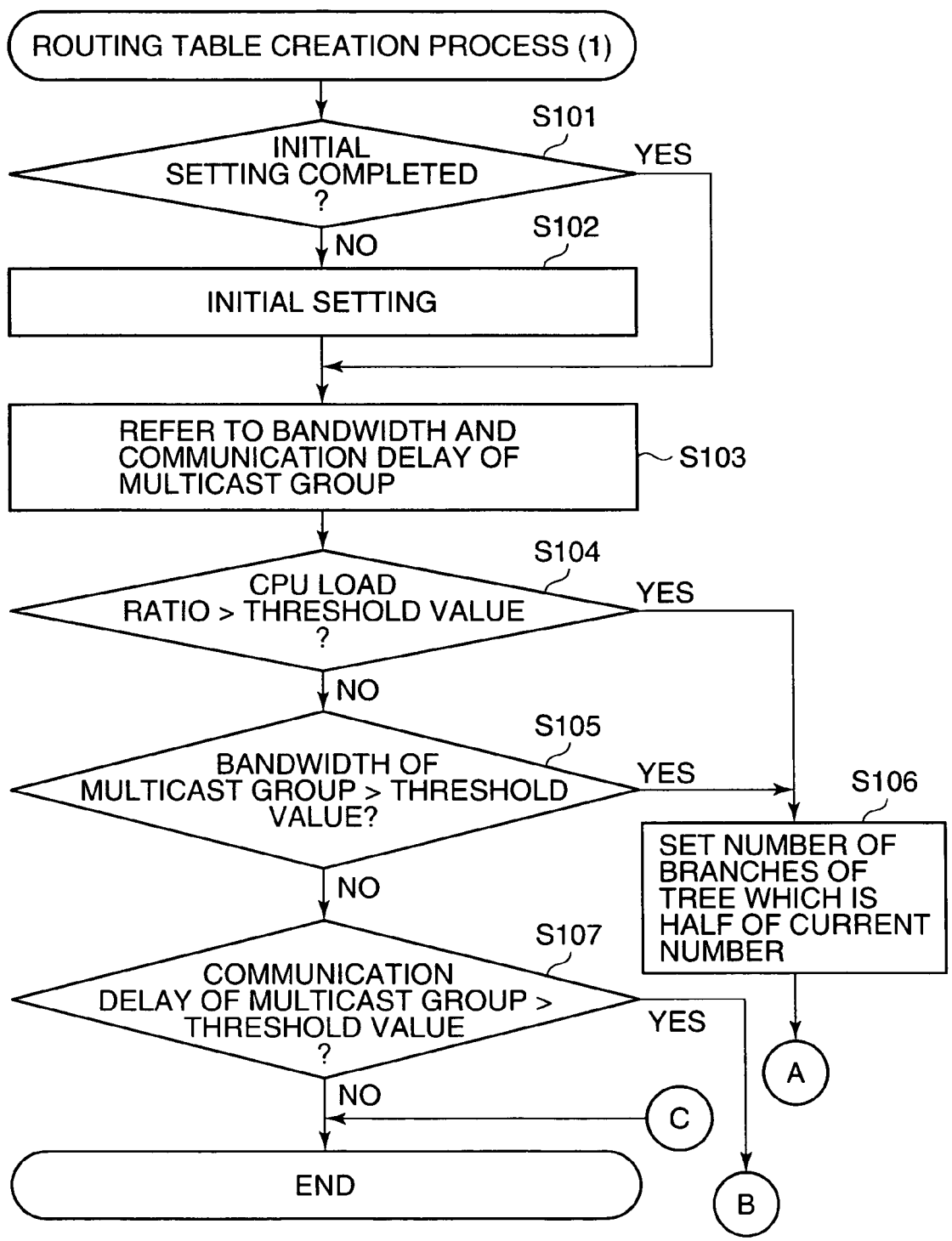
Figure 13A:
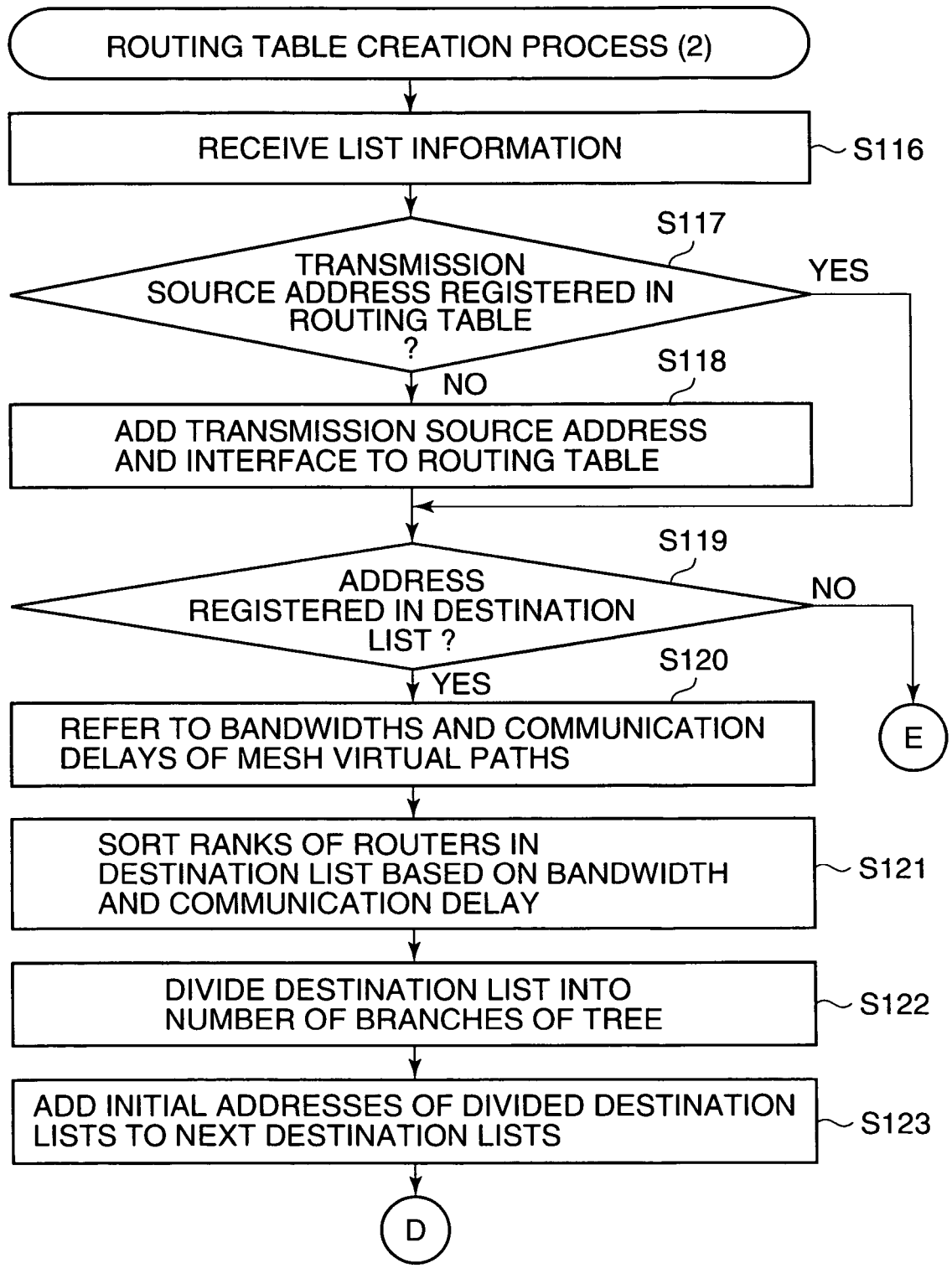
FIGS. 13A and 13B are a flowchart showing a routing table creation process executed by the distribution destination routers and the distribution source router.
Figure 13B:
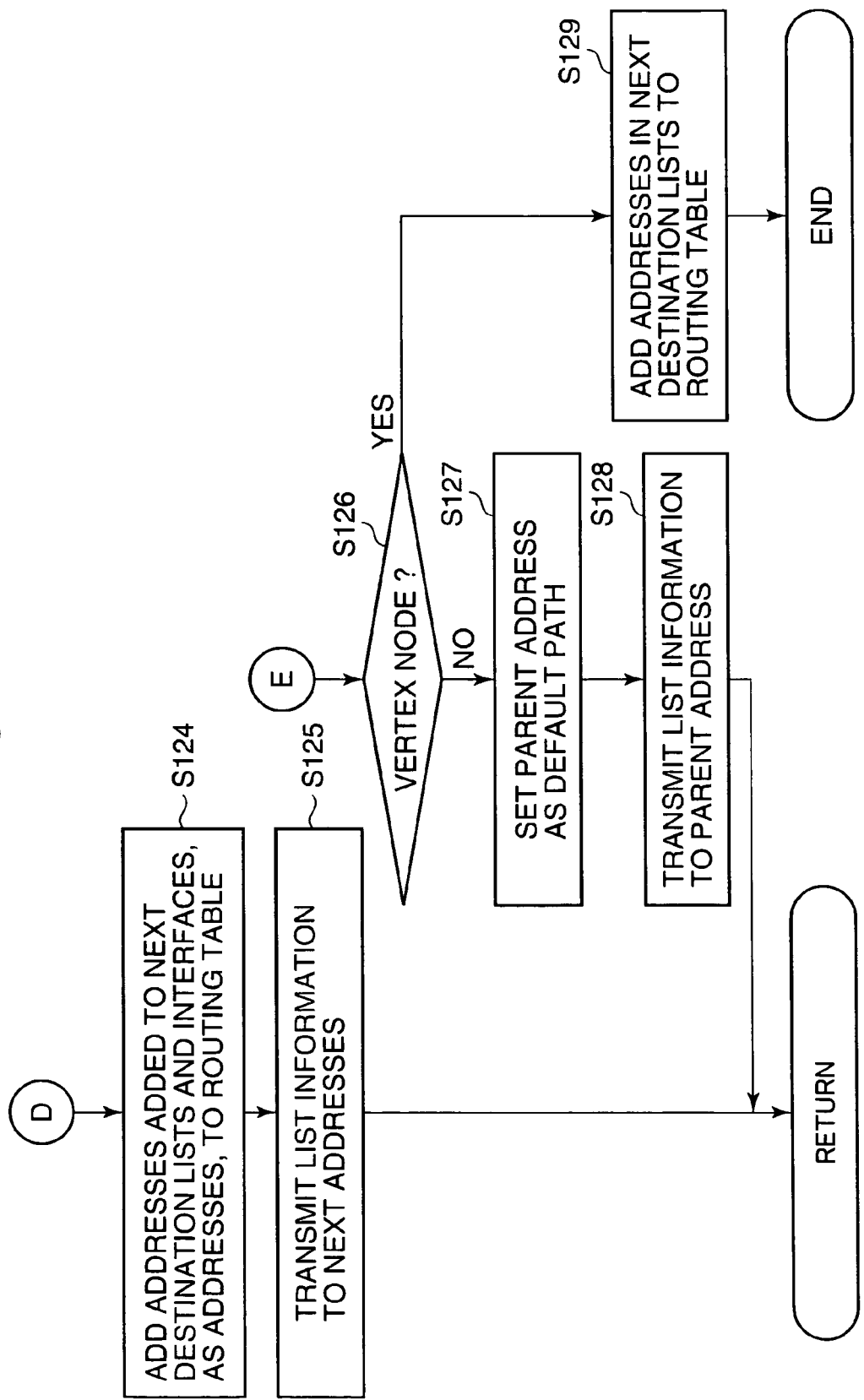

Next, with reference to FIGS. 4 to 13, a description will be given of the procedures for reconstructing the tree and recreating routing tables 10 based on the tree. FIGS. 4 to 11 show destination lists, routing tables, etc. which are sequentially created in routing table creation processes executed by the routers R. The tree is reconstructed in the order shown in FIGS. 4 to 11, whereby recreation of the routing tables 10 is implemented. FIGS. 12A and 12B show the procedures performed by the distribution source router to reconstruct the tree and recreate the routing table. FIGS. 13A and 13B show similar procedures executed by each of the distribution destination routers and the distribution source router. In the following, a description will be given of the procedures of recreation of the routing tables 10 in an example case where the tree for use in multicast distribution from the router Rs to the multicast group A (routers R1 to R5) is reconstructed and the router Rs serves as a vertex node. It is assumed that the router Rs stores the search DB 14 shown in FIG. 3 and the other routers R1 to R5 are disposed as shown in FIGS. 4 to 11. As shown in FIG. 4, interfaces between the routers R and the mesh virtual network are referred to as interfaces IF1 to IF5 in the order of counterclockwise direction.

First, operation of the distribution source router Rs is described with reference to FIGS. 12A and 12B. In a routing table creation process (1) shown in FIGS. 12A and 12B, the routing table management unit 15 of the router Rs checks whether initial setting is completed (S101). Whether the initial setting is completed is determined by determining whether a threshold value of the communication characteristic of multicast group A has been registered in the communication characteristic threshold values table of the search DB 14 (see, FIG. 3). Since a threshold value of the communication characteristic is registered when a packet is distributed for the first time, it is determined that the initial setting is already completed when a second or subsequent packet is distributed.

If the initial setting is completed (i.e., if the communication characteristic of multicast group A has been registered) (answer to S101 is Yes), the process proceeds to step S103. On the other hand, if the initial setting is not completed (i.e., if the communication characteristic of multicast group A has not been registered) (answer to S101 is No), the routing table management unit 15 registers a value of the communication characteristic of multicast group A measured by the monitoring unit 13, as a threshold value of the communication characteristic, into the communication characteristic threshold values table (S102), and the process proceeds to step S103.

In step S103, the routing table management unit 15 refers to the communication characteristics table of the search DB 14 (see, FIG. 3), and acquires the communication characteristic of multicast group. The communication characteristic of multicast group is periodically measured by the monitoring unit 13 and reflected on the communication characteristics table.

The routing table management unit 15 acquires a CPU load ratio measured by the monitoring unit 13 and checks whether the CPU load ratio exceeds the threshold value of CPU load ratio (50%) registered in the CPU threshold value table of the search DB 14 (see, FIG. 3) (S104). If the threshold value is exceeded (answer to S104 is Yes), the process proceeds to step S106.

If the CPU load ratio does not exceed the threshold value (50%) (answer to S104 is No), it is checked whether a bandwidth CAw of multicast group A registered in the communication characteristics table exceeds a threshold value Aw of bandwidth of the multicast group A registered in the communication characteristic threshold values table (S105). In other words, it is checked whether the latest bandwidth CAw of multicast group A measured by the monitoring unit 13 exceeds the threshold value Aw. The bandwidth of multicast group exceeding its threshold value represents that the bandwidth of the multicast group becomes narrower than the threshold value. If the threshold value Aw is exceeded (answer to S105 is Yes), the process proceeds to step S106.

In step S106, the routing table management unit 15 sets the number of branches of the tree to half of that currently set, and the process proceeds to step S109 to start reconstruction of the tree. At that time, the depth of the tree is updated so as to correspond to the number of branches of the tree set in step S106.

If the bandwidth CAw of multicast group A registered in the communication characteristics table does not exceed the threshold value Aw (answer to S105 is No), the routing table management unit 15 checks whether the communication delay CAd of multicast group A registered in the communication characteristics table exceeds the threshold value Ad of communication delay of multicast group A registered in the communication characteristic threshold values table (S107). That is, it is checked whether the latest communication delay CAd of multicast group A measured by the monitoring unit 13 exceeds the threshold value Ad. If the threshold value Ad is exceeded (answer to S107 is Yes), the routing table management unit 15 sets the depth of the tree to one which is one-stage deeper than that currently set (S108), and the process proceeds to step S109 to start reconstruction of the tree. At that time, the number of branches of the tree is updated so as to correspond to the depth of the tree set in step S108.

If the communication delay CAd of multicast group A registered in the communication characteristics table does not exceed the threshold value Ad (answer to S107 is No), the process is finished. In that case, multicast packet distribution is performed by using a general routing table 10.

It should be noted that in this embodiment whether the CPU load ratio, bandwidth, and communication delay exceed threshold values are determined in this order. However, whether the CPU load ratio, communication delay, and bandwidth exceed threshold values can be determined in this order. It is also possible to determine whether the CPU load ratio and bandwidth exceed threshold values or determine whether the CPU load ratio and communication delay exceed threshold values. In this manner, whether the CPU load ratio exceeds threshold value is first determined, thereby ensuring that the router Rs is avoided from becoming a high load state. If the communication characteristic requested by the multicast group is not satisfied, the router Rs starts to reconstruct the multicast tree, and therefore, multicast distribution that satisfies the communication characteristic requested by the multicast group can be carried out.

In step S109, the routing table management unit 15 creates a destination list (List_dest) in which packet transmission destination routers R1 to R5 are registered. Next, the routing table management unit 15 refers to path characteristics (bandwidths and communication delays) of virtual paths a to c registered in the path characteristics table (S110), and sorts the ranks of the routers R1 to R5 registered in the destination list based on the path characteristics (S111). That is, the ranks of the routers R1 to R5 registered in the destination list are sorted based on the latest bandwidth and communication delay of the virtual paths in the mesh virtual network which have been measured by the monitoring unit 13. At that time, the ranks of the routers R1 to R5 become higher in the decreasing order of bandwidth and become higher in the increasing order of communication delay. Among the virtual paths to the routers R1 to R5, the router Rs selects and utilizes a virtual path having a path characteristic margin, whereby the bandwidth load of the actual network constituting the virtual path from the router Rs to the routers R1 to R5 can be reduced. As a result, as shown in FIG. 4, the destination list for the router Rs is created in which the routers R1, R5, R4, R2, R3 are sorted in this order.

Figure 5:
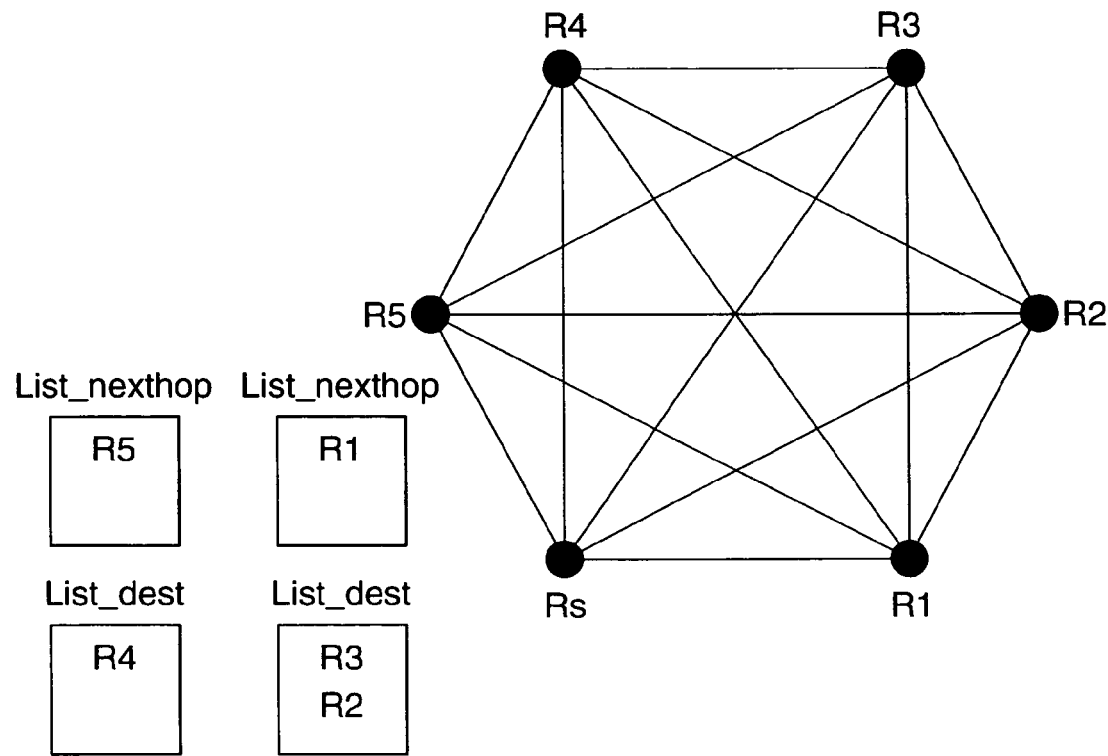
FIG. 5 is a view showing destination lists and next destination lists for the distribution source router created by the routing table creation process performed by the distribution source router, together with the mesh virtual network.

In the following, for simplicity of explanation, it is assumed that the number of branches of the tree is set to 2 by the processing in steps S101 to S108. The routing table management unit 15 divides the destination list into the set number (=2) of branches (S112), and registers initial addresses (routers R1, R5) of divided destination lists into next destination lists (List_nexthop) (S113), thereby creating the destination lists and the next destination lists for the router Rs as shown in FIG. 5.

Figure 6:
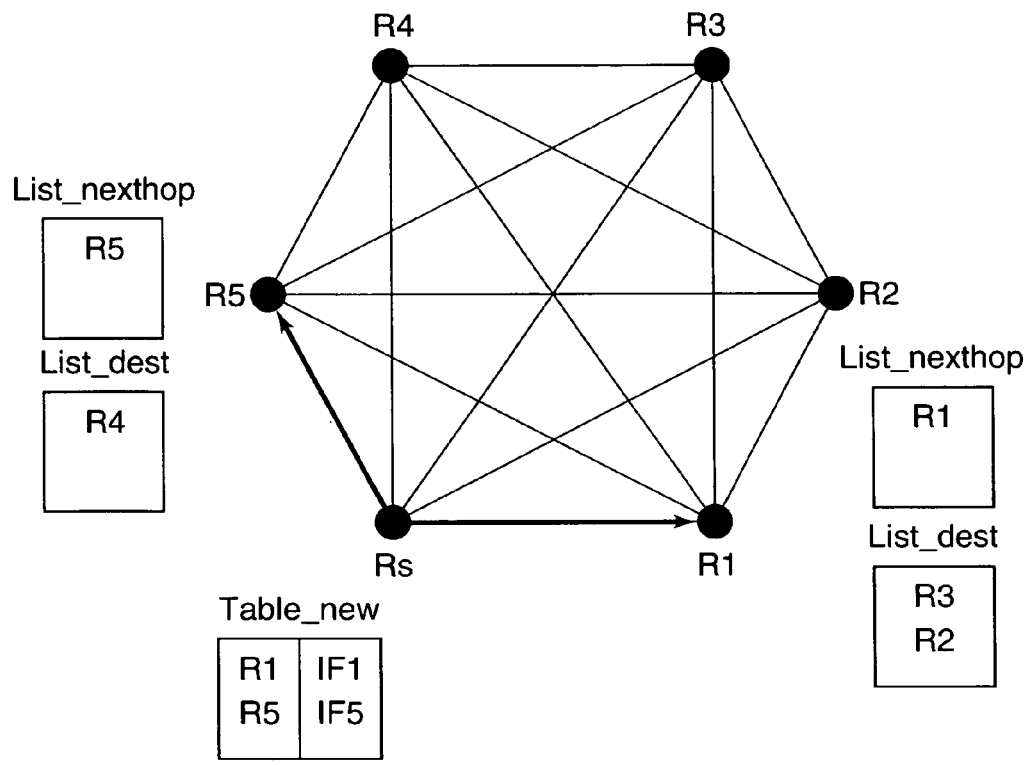
FIG. 6 is a view showing a routing table for the distribution source router created by the routing table creation process performed by the distribution source router and destination lists and next destination lists transmitted from the distribution source router to two distribution destination routers, together with the mesh virtual network.

The routing table management unit 15 registers, into the routing table (Table_new) 10, the addresses (routers R1, R5) registered in the next destination lists and interfaces IF1, IF5 between the routers R1, R5 and the mesh virtual network (S114). Next, the routing table management unit 15 outputs list information (destination lists, next destination lists, and the number of branches and the depth of the tree) to the forwarding engine 12. The forwarding engine 12 transmits respective pieces of list information via the interface unit 11 to the routers R1, R5 registered in the next destination lists (S115). As a result, the routing table 10 for the router Rs as shown in FIG. 6 is created, and the destination lists and the next destination lists are respectively transmitted to the routers R1, R5.

Next, with reference to FIGS. 13A and 13B, a description will be given of operation of the router R1 that receives list information from the router Rs, while omitting a description of operation of the router R5 for simplification of explanation. As shown in FIG. 13A, the forwarding engine 12 of the router R1 receives list information (destination list, next destination list, the number of branches and the depth of the tree) from the router Rs via the interface unit 11, and outputs the list information to the routing table management unit 15 (S116). The routing table management unit 15 checks whether a transmission source address (router Rs) is registered in the routing table 10 stored in the router R1 (S117). Since the transmission source address is not registered (answer to S117 is No), the transmission source address (router Rs) and the interface IF5 between router Rs and the mesh virtual network are registered into the routing table 10 (S118).

The routing table management unit 15 of the router R1 checks whether an address is registered in the destination list stored in the router R1 (S119). Since addresses are registered in the destination list (answer to S119 is Yes), the routing table management unit 15 refers to path characteristics (bandwidths and communication delays) of virtual paths registered in the path characteristics table of the router R1 (S120), and based on the path characteristics, sorts the ranks of the routers R2, R3 registered in the destination list (S121). Specifically, the ranks of the routers R2, R3 registered in the destination list are sorted based on the latest bandwidths and communication delays of virtual paths in the mesh virtual network measured by the monitoring unit 13. At that time, the ranks of the routers R2, R3 become higher in the decreasing order of bandwidth and become higher in the increasing order of communication delay. Among the virtual paths to the routers R2 and R3, the router R1 selects and utilizes a virtual path having a path characteristic margin, making it possible to reduce the bandwidth load of the actual network constituting the virtual path from the router R1 to the routers R2, R3.

Figure 7:
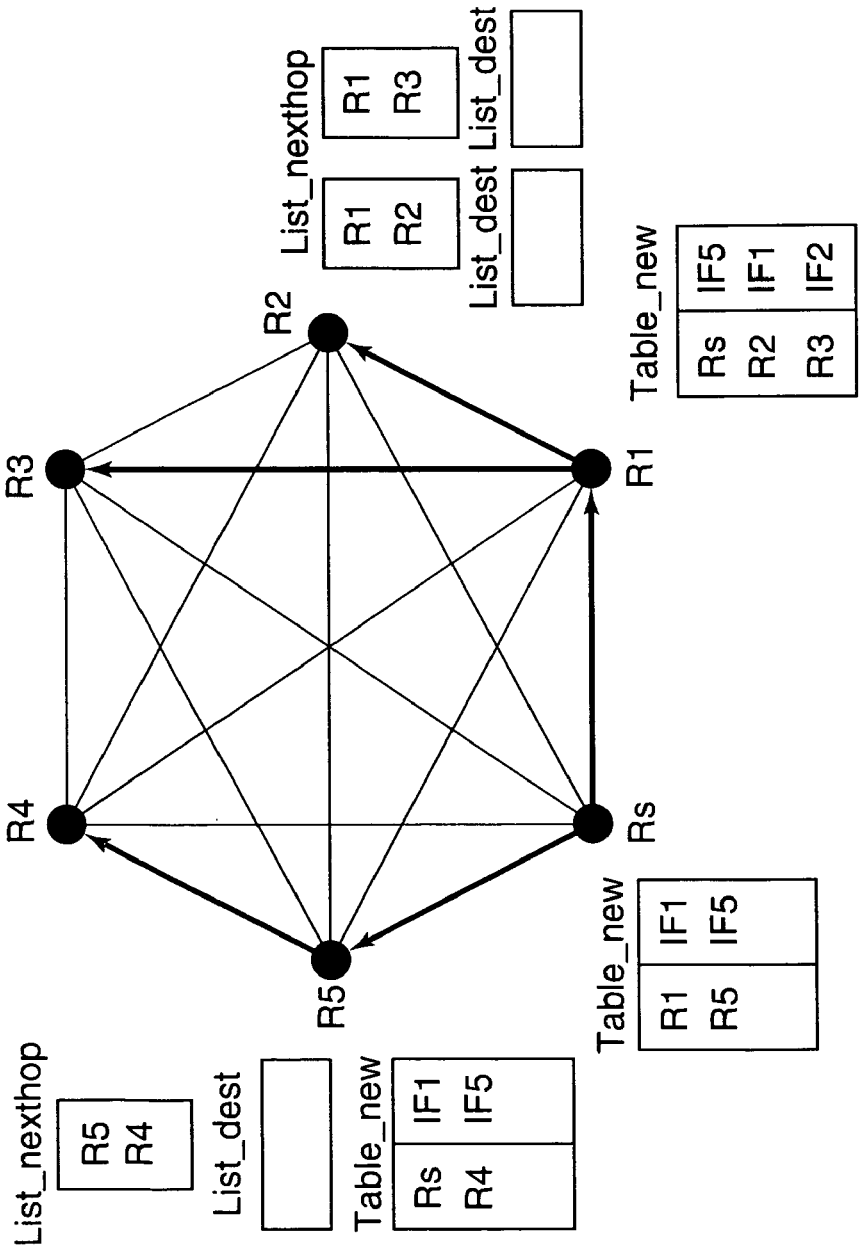
FIG. 7 is a view showing routing tables, destination lists, and next destination lists for the two distribution destination routers created by routing table creation processes performed by these two routers, together with the mesh virtual network.

Next, the routing table management unit 15 divides the destination list into the number of branches of the tree (=2) (S122), and adds initial addresses (routers R3, R2) of divided destination lists to next destination lists (S123). Further, the routing table management unit 15 registers into the routing table 10 the addresses (routers R3, R2) registered in the next destination lists and the interfaces IF2, IF1 between the routers R3, R2 and the mesh virtual network (S124). As a result, the destination lists, the next destination lists, and the routing table 10 for the router R1 as shown in FIG. 7 are created. Also, a destination list, next destination list, and routing table 10 for the router R5 as shown in FIG. 7 are created by the same procedure as those for the router R1.

Figure 8:
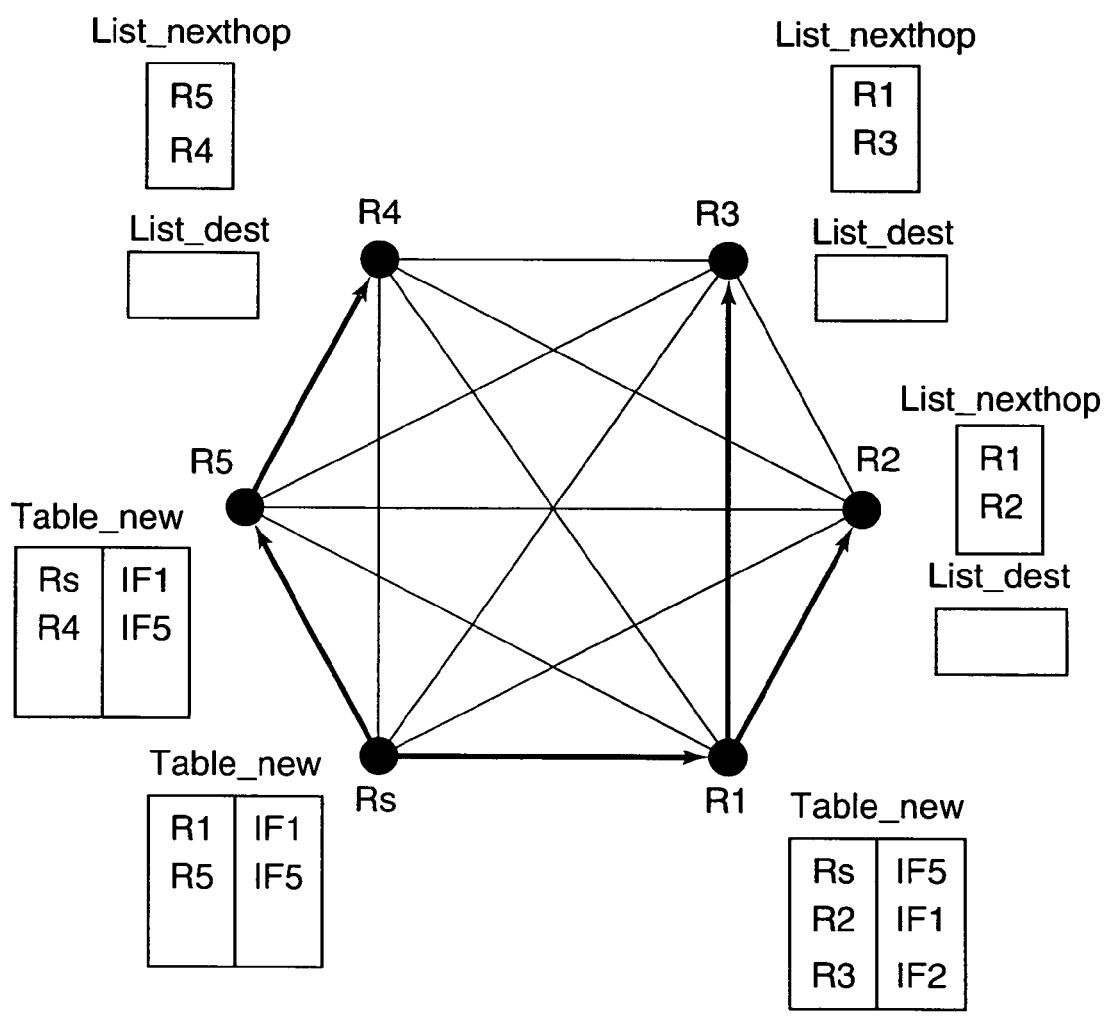
FIG. 8 is a view showing destination lists and next destination lists transmitted from the two distribution destination routers to three child routers in routing table creation processes executed by the two routers, together with routing tables for the distribution source router and the two distribution destination routers and the mesh virtual network.

The routing table management unit 15 of the router R1 outputs the list information (destination lists, next destination lists, the number of branches and depth of the tree) to the forwarding engine 12. The forwarding engine 12 transmits the list information via the interface unit 11 to the routers R3, R2 registered in the next destination lists (S125). As a result, as shown in FIG. 8, the destination lists and the next destination lists are respectively transmitted from the router R1 to the routers R3, R2. As shown in FIG. 8, the destination list and the next destination list are also transmitted from the router R5 to the router R4 in the same procedure as those for the router R1. Thus, a one-directional tree in which the router Rs serves as a vertex node is completed.

Next, with reference to FIGS. 13A and 13B, a description will be given of operation of the router R2 that receives list information from the router R1. For simplicity of explanation, a description of operations of the routers R3, R4 that respectively receive list information from the routers R1, R5 is omitted. As shown in FIG. 13A, the forwarding engine 12 of the router R2 receives list information (destination list, next destination list, the number of branches and the depth of the tree) from the router R1 via the interface unit 11, and outputs the list information to the routing table management unit 15 (S116). The routing table management unit 15 checks whether a transmission source address (router Rs) is registered in the routing table 10 stored in the router R2 (S117). Since the transmission source address is not registered (answer to S117 is No), the forwarding engine 12 registers a transmission source address (router R1) and the interface IF5 between the router R1 and the mesh virtual network into the routing table 10 (S118).

Figure 9:
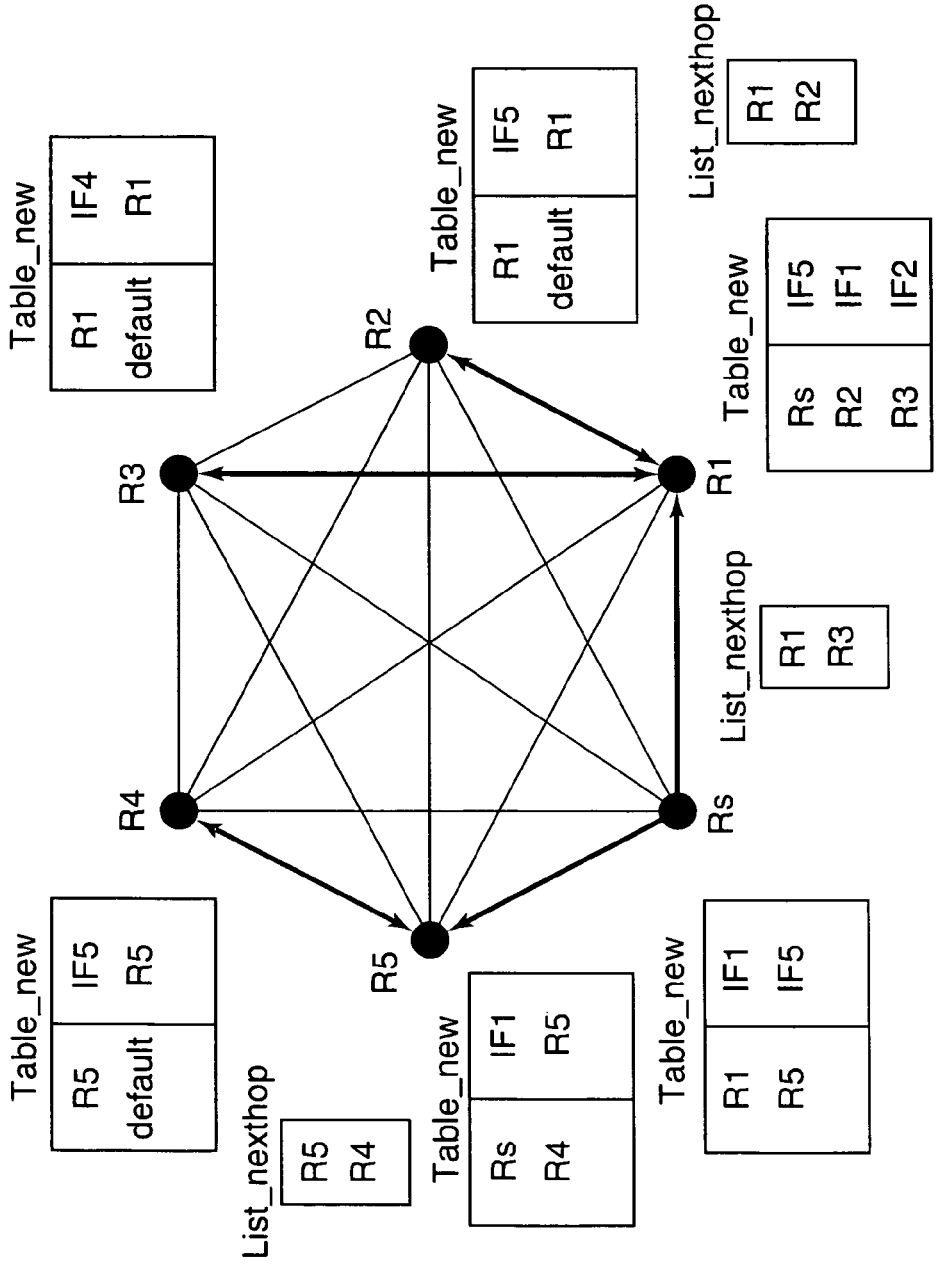
FIG. 9 is a view showing routing tables for the child routers and next destination lists transmitted from the child routers to two parent routers, which are created in routing table creation processes executed by the three child routers, together with routing tables for the distribution source router and the parent routers, and the mesh virtual network.

The routing table management unit 15 of the router R2 checks whether an address is registered in the destination list stored in the router R2 (S119). Since no address is registered in the destination list (answer to S119 is No), the routing table management unit 15 checks whether the router R2 is a vertex node (S126). Since the router R2 is not a vertex node (answer to S126 is No), the routing table management unit 15 registers, as a default path, a parent address (router R1) of the router R2 into the routing table 10 (S127), and outputs the list information (next destination list) to the forwarding engine 12. The forwarding engine 12 transmits the list information to the router R1 (the parent address of the router R2) via the interface unit 11 (S128). As a result, the routing table 10 for the router R2 as shown in FIG. 9 is completed, and the next destination list is transmitted to the router R1. As with the same procedures as those for the router R2, the routing tables 10 for the routers R3, R4 are created, and the next destination lists are respectively transmitted to the routers R1, R5.

Next, with reference to FIGS. 13A and 13B, a description will be given of operation of the router R1 that receives list information (next destination lists) from the routers R2, R3. It should be noted that operation of the router R5 that receives the list information from the router R4 is omitted for simplicity of description. As shown in FIG. 13A, the forwarding engine 12 of the router R1 outputs to the routing table management unit 15 the list information (next destination lists) received via the interface unit 11 from the routers R2, R3 (S116). The routing table management unit 15 checks whether one or more transmission source addresses (routers R2, R3) are registered in the routing table 10 stored in the router R1 (S117). Since transmission source addresses are registered (answer to S117 is Yes), the routing table management unit 15 checks whether an address is registered in the destination list stored in the router R1 (S119). Since no address is registered in the destination list (answer to S119 is No), the routing table management unit 15 checks whether the router R1 is a vertex node (S126). Since the router R1 is not a vertex node (answer to S126 is No), the routing table management unit 15 registers, as a default path, a parent address (router Rs) of the router R1 into the routing table 10 (S127), and outputs the list information (next destination list) to the forwarding engine 12. The forwarding engine 12 transmits the list information to the router Rs at the parent address of the router R1 via the interface unit 11 (S128). As a result, the routing table 10 of the router R1 as shown in FIG. 10 is completed, and the next destination list is transmitted to the router Rs. With the procedures similar to those for the router R1, the routing table 10 for the router R2 as shown in FIG. 10 is completed and a next destination list is transmitted to the router Rs.

Next, with reference to FIGS. 13A and 13B, a description will be given of operation of the router Rs that receives the list information (next destination lists) from the routers R1, R5. As shown in FIG. 13A, the forwarding engine 12 of the router Rs receives via the interface unit 11 the list information (next destination lists), and outputs the list information to the routing table management unit 15 (S116). The routing table management unit 15 checks whether a transmission source address (router R1) is registered in the routing table 10 stored in the router Rs (S117). Since a transmission source address is registered (answer to S117 is Yes), the routing table management unit 15 checks whether an address is registered in the destination list stored in the router Rs (S119). Since no address is registered in the destination list (answer to S119 is No), the routing table management unit 15 checks whether the router Rs is a vertex node (S126). Since the router Rs is a vertex node (answer to S126 is Yes), the routing table management unit 15 registers the addresses registered in the next destination lists into the routing table 10 (S129), whereby the routing table 10 for the router Rs as shown in FIG. 11 is completed.

As a result, the routing tables 10 for the routers R for use in multicast distribution from the router Rs are completed. That is, a bi-directional tree in which the router Rs serves as the vertex node is completed. Specifically, the routing tables 10 for the routers R which are utilized by the routers R at multicast distribution from the router Rs are completed. The router Rs performs packet distribution based on the completed routing table 10.

It should be noted that in this embodiment, the mesh virtual network is formed by six routers R, but this is not limitative. The mesh virtual network can be formed by any plurality of routers R. Routers R that constitute another multicast tree may be connected to the mesh virtual network. In this embodiment, the communication devices PC are connected, one for each router R, but this is not limitative. A plurality of communication devices Pc may be connected to each router R.

As described above, in the multicast distribution system of this embodiment, a threshold value of communication characteristic is set for every multicast group when multicast distribution is performed between routers R connected to a mesh virtual network, and if the communication characteristic of the multicast group exceeds the threshold value, the tree is reconstructed based on the path characteristic of the mesh virtual network, whereby routing tables 10 for the multicast group are created. As a result, the multicast distribution system is able to perform multicast distribution with the communication characteristic requested by the multicast group.

With the routing tables 10 complying with the communication characteristic requested by multicast group, the router Rs that performs multicast distribution serves as a vertex node and the other routers R1 to R5 are virtually disposed in a tree-shaped structure, whereby packets are sequentially distributed from routers set as parent nodes to routers set as child nodes. As a result, the router Rs that performs multicast packet distribution is not required to directly distribute packets to all the other routers R1 to R5, and therefore, the load of the CPU of the router Rs that performs multicast packet distribution can be reduced.

With the reduction in the load of the CPU of the router Rs that distributes multicast packets, the actual network bandwidth load at the time of multicast packet distribution from the router Rs can be reduced. As a result, even if the CPU load of the router Rs increases or the actual network bandwidth load increases, multicast distribution that satisfies the communication characteristic requested by the multicast group can be achieved by changing the multicast packet distribution path, without the need of hardware augmentation such as adding more CPU to the router Rs or expanding the actual network bandwidth. Accordingly, wasteful facility investment can be suppressed and scalability of multicast distribution can be ensured.

In general, a communication delay is produced by the destruction of packets distributed from the routers R, if the bandwidth becomes narrower due to, e.g., increase in the number of packets transmitted from the routers R1 to R5 and passing through the mesh virtual network. However, the routers R of this embodiment periodically recreate the routing tables 10, whereby the distribution can be performed without destroying multicast packets.

In the routers R of this embodiment, the routing table 10 is periodically reset to a default routing table 10 for distributing multicast packets from the router Rs directly to other routers R1 to R5. At the multicast distribution, the routers R determine whether communication characteristic threshold values are satisfied, and recreate the routing tables 10. As a result, even if the number of packets passing through the mesh virtual network temporarily increases to cause a communication delay, the communication path can be changed when the communication delay is eliminated and multicast packet distribution can be carried out. In this manner, since the routing tables 10 can be changed according to the path characteristic of the mesh virtual network, the routers R are able to carry out multicast packet distribution by selecting, according to the path characteristic of the mesh virtual network, a communication path having a communication characteristic requested by the multicast group.

INDUSTRIAL APPLICABILITY

According to the present invention, the multicast tree can be reconstructed according to the load state of the distribution source router and the communication characteristic of the multicast group concerned, whereby multicast distribution can be carried out by selecting a communication path that satisfies a communication characteristic requested by the multicast group.

The invention claimed is:

1. A multicast distribution system in which multicast distribution is performed from a distribution source router to a plurality of distribution destination routers constituting a multicast network formed on a mesh virtual network, wherein the distribution source router comprises:

a monitor unit configured to monitor and detect a CPU load ratio in the distribution source router, a communication characteristic of a multicast group constructed on the multicast network, and a path characteristic of the mesh virtual network;

a storage unit configured to store a threshold value of the CPU load ratio and a threshold value of the communication characteristic of the multicast group; and a control unit configured, based on the path characteristic of the mesh virtual network detected by said monitor unit and at least one of a result of comparison between the CPU load ratio detected by said monitor unit and the threshold value of the CPU load ratio stored in said storage unit and a result of comparison between the communication characteristic of the multicast group detected by said monitor unit and the threshold value of the communication characteristic of the multicast group stored in said storage unit, to start reconstruction of a multicast tree that defines a packet distribution path from the distribution source router, and based on the multicast tree, start recreation of a routing table that decides a multicast distribution path, wherein said control unit of the distribution source router is configured, in a case where at least one of values of the CPU load ratio monitored by said monitor unit and the communication characteristic of the multicast group monitored by said monitor unit exceeds the threshold value thereof, to reduce a number of branches and increase a depth of the multicast tree and start reconstruction of the multicast tree based on the reduced number of branches and the increased depth of the multicast tree, and a virtual path selected, from among a plurality of virtual paths, so as to have a path characteristic margin.

2. The multicast distribution system according to claim 1, wherein each of the distribution destination routers comprises:

a second monitor unit configured to monitor the path characteristic of the mesh virtual network;

a communication unit configured to distribute and receive distribution information that instructs distribution of packets;

a second control unit configured to implement reconstruction of the multicast tree that defines the packet distribution path from the distribution source router, based on the reduced number of branches and the increased depth of the multicast tree contained in the distribution information, and the selected virtual path having the path characteristic margin, acquired by said second monitor unit, and based on the multicast tree, implement recreation of a routing table that decides the multicast distribution path, wherein said control unit of the distribution source router completes the multicast tree when the recreation of the routing tables of all the distribution destination routers is completed.

3. The multicast distribution system according claim 1, wherein said storage unit of the distribution source router stores, as the threshold value of the communication characteristic of the multicast group, the communication characteristic of the multicast group detected by said monitor unit of the distribution source router when a packet is initially distributed to the multicast group.

4. The multicast distribution system according to claim 1, wherein said control unit of the distribution source router determines, at predetermined timings, whether the multicast tree should be reconstructed.

5. The multicast distribution system according to claim 1, wherein the communication characteristic comprises a bandwidth or a communication delay amount of the multicast group and the path characteristic comprises a bandwidth or a communication delay amount of the mesh virtual network.

6. A multicast distribution method in which multicast distribution is performed from a distribution source router to a plurality of distribution destination routers constituting a multicast network formed on a mesh virtual network, the method comprising the steps of:

monitoring and detecting, by the distribution source router, a CPU load ratio in the distribution source router, a communication characteristic of a multicast group constructed on the multicast network, and a path characteristic of the mesh virtual network;

reading, by the distribution source router, a threshold value of the CPU load ratio and a threshold value of the communication characteristic of the multicast group, which are stored in a storage unit; and reducing a number of branches and increasing a depth of a multicast tree by the distribution source router in a case where at least one of values of the CPU load ratio and the communication characteristic of the multicast group exceeds the threshold value of the CPU load ratio or the communication characteristic of the multicast group, starting, based on the reduced number of branches and the increased depth of the multicast tree and a virtual path selected, from among a plurality of virtual paths, so as to have a path characteristic margin, reconstruction of the multicast tree for distributing packets from the distribution source router, and starting, based on the multicast tree, recreation of routing tables that decide a multicast distribution path.

* * * * *